(12) United States Patent
Armistead

(10) Patent No.: US 10,345,530 B2
(45) Date of Patent: Jul. 9, 2019

(54) ALIGNMENT ASSEMBLY AND SUBSEA FIBER OPTICAL CONNECTOR

(71) Applicant: Siemens Aktiengesellschaft, Munich (DE)

(72) Inventor: Robert Armistead, Ulverston (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/774,443

(22) PCT Filed: Oct. 31, 2016

(86) PCT No.: PCT/EP2016/076258
§ 371 (c)(1),
(2) Date: May 8, 2018

(87) PCT Pub. No.: WO2017/084869
PCT Pub. Date: May 26, 2017

(65) Prior Publication Data
US 2018/0306979 A1 Oct. 25, 2018

(30) Foreign Application Priority Data
Nov. 16, 2015 (EP) .................................... 15194712

(51) Int. Cl.
*G02B 6/38* (2006.01)

(52) U.S. Cl.
CPC ......... *G02B 6/3816* (2013.01); *G02B 6/3821* (2013.01); *G02B 6/3869* (2013.01);
(Continued)

(58) Field of Classification Search
None
See application file for complete search history.

(56) References Cited

U.S. PATENT DOCUMENTS

| 5,276,750 A | 1/1994 | Manning |
| 6,929,404 B2 | 8/2005 | Jones et al. |
| 2012/0033916 A1 | 2/2012 | Lagathu et al. |

FOREIGN PATENT DOCUMENTS

| CA | 2052331 A1 | 3/1993 |
| JP | H04174407 A | 6/1992 |

OTHER PUBLICATIONS

International Search Report dated Jan. 20, 2017, for PCT/EP2016/076258.

(Continued)

*Primary Examiner* — Jerry Rahll
(74) *Attorney, Agent, or Firm* — Beusse Wolter Sanks & Marie

(57) ABSTRACT

An alignment assembly of a first connector part for aligning a first fiber ferrule of the first connector part with a second fiber ferrule of a second connector part during mating of the first connector part with the second connector part. The alignment assembly includes a ferrule carrier to which the first fiber ferrule is mounted. The ferrule carrier is mounted to the first connector part by a support structure. The support structure is configured to allow a movement of the ferrule carrier relative to the first connector part in at least a lateral direction that is substantially perpendicular to an engagement direction of the first fiber ferrule with the second fiber ferrule. A first guiding structure is mounted to or forms part of the ferrule carrier. The first guiding structure is configured to mechanically interact with a complementary second guiding structure that is provided in the second connector part.

21 Claims, 5 Drawing Sheets

(52) U.S. Cl.
CPC ......... *G02B 6/3875* (2013.01); *G02B 6/3882* (2013.01); *G02B 6/3885* (2013.01)

(56) References Cited

OTHER PUBLICATIONS

EP Search Report dated May 23, 2016, for EP patent application No. 15194712.4.

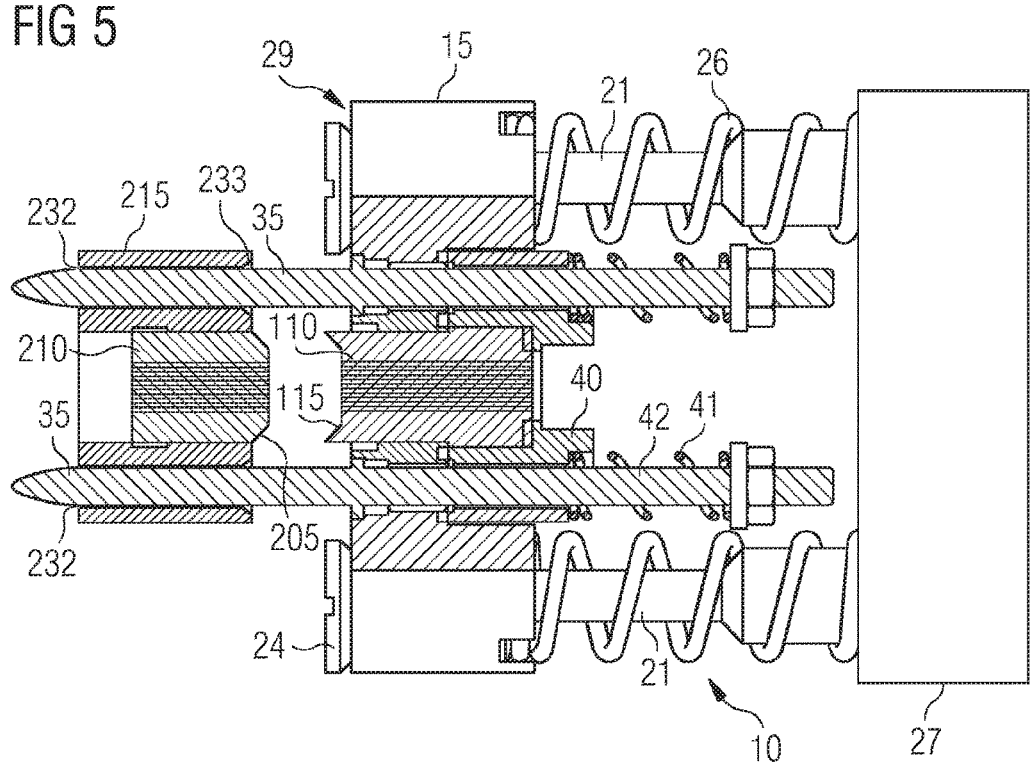
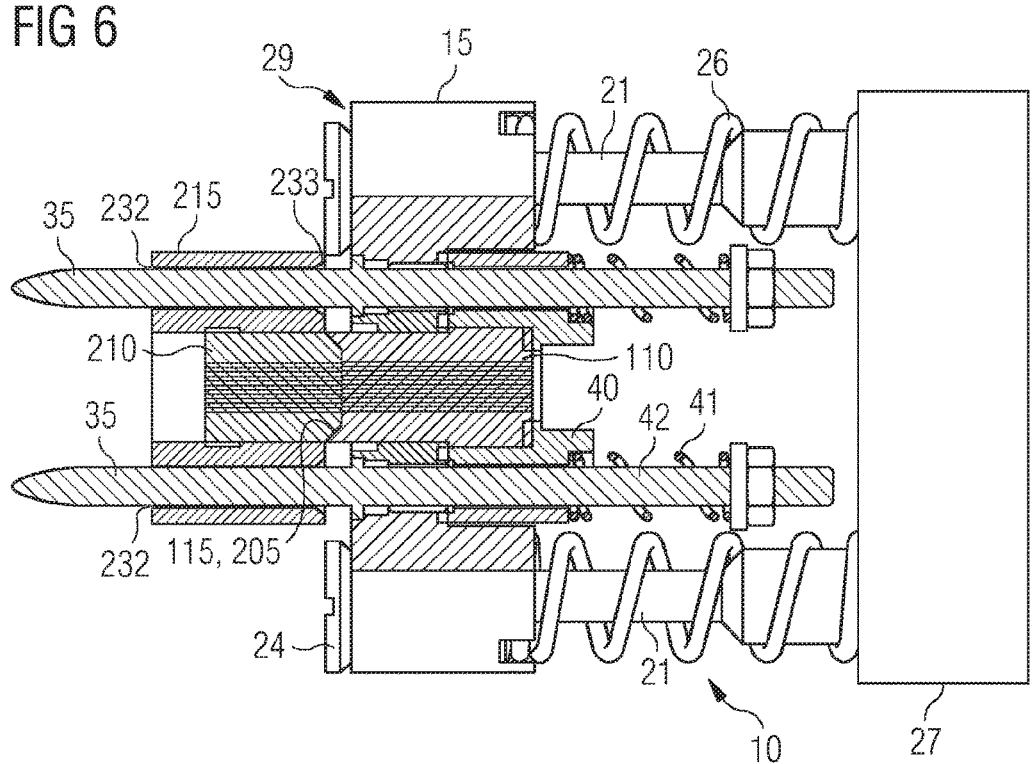

ALIGNMENT ASSEMBLY AND SUBSEA FIBER OPTICAL CONNECTOR

CROSS REFERENCE TO RELATED APPLICATIONS

This application is the US National Stage of International Application No. PCT/EP2016/076258 filed Oct. 31, 2016, and claims the benefit thereof. The International Application claims the benefit of European Application No. EP15194712 filed Nov. 16, 2015. All of the applications are incorporated by reference herein in their entirety.

FIELD OF THE INVENTION

The present invention relates to an alignment assembly, to a subsea fiber optical connector including a first connector part comprising such alignment assembly, and to a method of connecting a first connector part and a second connector part of a subsea connector.

BACKGROUND

Several applications are known in which connections need to be provided underwater, such as electrical connections and/or optical connections. Examples include a subsea installation for the production of hydrocarbons from a subsea well, in which different components of the subsea installation may need to be connected for power transfer and/or data communication. Such connections may for example comprise a connection from a topside installation, such as a floating or fixed platform, or from an onshore site, to a subsea component, for example by means of an umbilical or a subsea cable. Other connections include electrical connections between different type of subsea equipment, such as a connection between a subsea transformer and subsea switchgear, a data connection between different control modules or between a hub and a satellite well. In some configurations, a data connection may need to be provided over increased distances, for example between two subsea wells that are more than 1 km apart, for which purpose an optical data connection is particularly beneficial, in particular when making use of an Ethernet data connection.

For providing an underwater connection, wet-mateable connectors are known which can be mated underwater. Although such type of connectors are generally more complex than corresponding dry-mate connectors, which have to be mated above the water surface, wet-mateable connectors have several advantages. Components of the subsea installation can for example be disconnected and can be retrieved for servicing or exchange, additional components may be connected to an existing subsea installation, connections can be provided to a subsea structure after installation thereof at the ocean floor, and the like. When establishing a connection subsea, a first connector part, for example a plug part, is engaged with a second connector part, for example a receptacle part. Due to the large water depth, this is generally done by making use of a remotely operated vehicle (ROV), which holds one connector part and engages it with the other connector part.

As an example, the document U.S. Pat. No. 6,929,404 B2 discloses a subsea wet-mateable fiber optical connector including a first connector part and a second connector part. A pin including an optical contact of the first connector part enters the second connector part in which the optical contact is deployed and engages a corresponding optical contact of the second connector part.

Furthermore, top-side optical connectors are known and used in dry environments which include plastic housings that are connected by hand by the operator. Such plastic housing may for example include a latching mechanism to maintain the contact between the two optical fibers.

While manual alignment of such top-side connectors can be done with high precision, alignment of the optical contacts of a subsea wet-mateable connector is generally difficult, since mating occurs via the remotely operated vehicle (ROV). Manufacturing tolerances of the different parts of such subsea connector can potentially lead to a misalignment of the optical contacts, which can result in a poor signal quality or a complete signal failure after mating. Furthermore, the end faces of such optical contacts are generally rather sensitive due to the fragility of optical fibers and the large forces that may be exerted on the relatively small area between the optical fibers. Since such subsea connectors are mated by an ROV, there is generally only relatively limited control over the contact forces of such optical fibers, which can result in a fiber end face damage.

Accordingly, it is desirable to improve the reliability of the mating of such subsea connectors, and in particular to ensure that a connection can be established that does not suffer from poor signal quality or complete signal failure. Furthermore, damage to a fiber end face during the mating should be avoided. It is desirable that a reliable connection between optical contacts can be established even when manufacturing tolerances or mating by an ROV can result in a misalignment of the optical contacts of respective connector parts.

SUMMARY

Accordingly, there is a need to improve the reliability of establishing an optical connection in a subsea environment, and in particular to mitigate at least one of the drawbacks mentioned above.

This need is met by the features of the independent claims. The dependent claims describe embodiments of the invention.

According to an embodiment of the invention, an alignment assembly of a first connector part for aligning a first fiber ferrule of the first connector part with a second fiber ferrule of a second connector part during the mating of the first connector part with the second connector part is provided. The alignment assembly comprises a ferrule carrier (also termed first ferrule carrier) to which the first fiber ferrule is mounted. The ferrule carrier is mounted by means of a support structure to the first connector part. The support structure is configured to allow a movement of the ferrule carrier relative to the first connector part (in particular to a body or housing of the first connector part) in at least a lateral direction that is substantially perpendicular to an engagement direction of the first fiber ferrule with the second fiber ferrule. The alignment assembly further comprises a first guiding structure that is mounted to or forms part of the fiber ferrule carrier. The first guiding structure is configured to mechanically interact with a complementary second guiding structure that is provided in the second connector part. The interaction is such that during mating of the first connector part with the second connector part, the ferrule carrier is moved on the support structure into alignment with a second ferrule carrier carrying the second fiber ferrule of the second connector part. The interaction can for example be a mechanical interaction which forces the ferrule carrier, which may also be termed "first ferrule carrier", into alignment with the second ferrule carrier.

Advantageously, the support structure allows both movement in the lateral direction and movement in at least one rotational direction.

By means of such alignment assembly, the first fiber ferrule can be automatically aligned with the second fiber ferrule during the mating of the first and second connector parts. No operator interaction is necessary to perform the alignment, other than the one required for mating the first and second connector parts. In particular, the ferrule carrier, the support structure and the first guiding structure can provide a coarse alignment between the first fiber ferrule and the second fiber ferrule, so that an additional alignment mechanism of the two fiber ferrules can engage and can 'fine-tune' the alignment between one or more optical fibers for establishing an optical connection. By providing such automatic coarse alignment of the first and second fiber ferrules, the establishing of a reliable connection that does not suffer from poor signal quality or complete signal failure may be achieved.

In an embodiment, the support structure comprises a guide along which the ferrule carrier is movable in the engagement direction. A clearance is provided between the guide and the ferrule carrier to allow the movement of the ferrule carrier in at least the lateral direction relative to the first connector part. Advantageously, the clearance also allows movement of the ferrule carrier in a rotational direction relative to the first connector part, for example relative to a housing or body of the first connector part. By means of such clearance, a lateral movement of the ferrule carrier can be provided without a significant increase in the complexity of the first connector part.

In some embodiment, the guide may be provided by one or more through holes in a component of the first connector part through which one or more rods extend from the ferrule carrier, the rods forming part of the ferrule carrier. The clearance is then provided between the through hole and the respective rod.

In another embodiment, the guide may comprise at least one guiding rod, guiding pin or guiding bolt that is mounted fixedly with respect to a component of the first connector part or with respect to the ferrule carrier (in particular with respect to a housing or body thereof). Advantageously, two such guiding rods, guiding pins or guiding bolts are provided, with a respective clearance. As an example, the ferrule carrier may comprise one or more through holes through which the one or more guiding rods reach, with a respective clearance between the ferrule carrier or the guiding rod, or the support structure may comprise a mount or support having respective through holes through which respective guides mounted to the ferrule carrier reach. Such mount or support may be fixedly attached within the first connector part, or may be movably attached within the first connector part, for example on a damper body. The mount or support, which can also be part of a housing or body of the first connector part, or can be a separate component, is hereinafter designated as fixed part of the support structure (although as outlined above, it might be movable with respect to the first connector housing or body, or not).

The ferrule carrier and the support structure may have an alignment feature that positions the ferrule carrier in a predetermined position and orientation (for example with respect to a body or housing of the first connector part) when the first connector part is in a de-mated state. The initial misalignment between the first and the second fiber ferrules upon mating of the first and second connector parts may thus be kept relatively low.

As an example, the alignment feature may comprise a seat on one of the ferrule carrier or a fixed part of the support structure. It may further comprise an engagement element on the other of the ferrule carrier or the fixed part of the support structure. The seat is shaped to receive the engagement element to provide the alignment in the predetermined position. The seat may for example be a recess formed in the ferrule carrier or in the fixed part of the support structure.

In an embodiment, the engagement element is a countersunk head of a guiding rod, guiding pin or a guiding bolt, and the seat is shaped to receive the countersunk head to provide the alignment. In such configuration, an alignment of the ferrule carrier in the unmated state of the first connector part can be achieved with relatively simple means. In particular, when using two guides, a reliable alignment of the position and orientation of the ferrule carrier can be achieved.

The support structure may comprise one or more springs that urge the ferrule carrier in a forward direction. In particular, such springs may urge the engagement element into engagement with the seat. The engagement element may both provide a stop for such movement effected by the one or more springs, and may at the same time provide the alignment of the ferrule carrier in the de-mated state. Such spring may for example be provided around the above mentioned guiding rod, guiding pin or guiding bolt.

In an embodiment, the ferrule carrier is urged by a spring into a first position in which the ferrule carrier has a predetermined alignment with respect to the first connector part. The ferrule carrier may furthermore be movable during mating against the spring force into a second position in which the alignment of the ferrule carrier with respect to the first connector part is released to allow the movement in lateral direction of the ferrule carrier, advantageously both in a lateral and in a rotational direction. As an example, when the first and the second ferrule carriers and thus the respective first and second guiding structures are misaligned during mating, the first ferrule carrier may be pushed rearwardly against the spring force, whereupon the engagement element separates from the seat to allow movement of the first ferrule carrier due to the clearance that is provided towards the guide.

In an embodiment, the support structure is configured to allow a movement of the ferrule carrier relative to the first connector part in at least two, advantageously three rotational directions and/or in two lateral directions that are substantially perpendicular to the engagement direction of the first fiber ferrule with the second fiber ferrule. Accordingly, even if the first fiber ferrule has a misalignment in rotational direction about all three axis, and furthermore a positional misalignment in the two lateral directions, an automatic coarse alignment may be achieved by the alignment assembly, which in turn allows the engagement of the first fiber ferrule with the second fiber ferrule.

In an embodiment, the alignment assembly further comprises a ferrule mount by means of which the first fiber ferrule is mounted to the ferrule carrier. The ferrule mount is configured to allow a movement of the first fiber ferrule relative to the ferrule carrier in a direction substantially parallel to the engagement direction. By means of such arrangement, the contact force between the first fiber ferrule and the second fiber ferrule during mating or in the mated state may be controlled.

As an example, the ferrule mount may comprise a preloading element that applies a predefined preloading force to the first fiber ferrule in a forward direction. Accordingly, when this preloading force is exceeded during the mating, the fiber ferrule can move rearwardly, thereby limiting the contact force between the first fiber ferrule and the second fiber ferrule. Damage to the one or more optical fibers that are held in the first fiber ferrule or in the second fiber ferrule may thus be prevented.

The first fiber ferrule or the ferrule mount may furthermore comprise an alignment member for providing fine alignment between the first fiber ferrule and the second fiber ferrule. The alignment member may comprise a specific shape of the front face of the first fiber ferrule and a complementary shape of the front face of the second fiber ferrule. In other configurations, such alignment member may comprise guide holes or guide pins on the first fiber ferrule or on the ferrule mount.

The ferrule mount may comprise one or more guide pins that guide the movement of the first fiber ferrule in the engagement direction relative to the ferrule carrier. It may further comprise one or more springs as preloading elements that preload the first fiber ferrule in the forward direction. These one or more springs may be provided around the one or more guide pins.

The one or more guide pins of the ferrule mount may furthermore form part of the first guiding structure of the alignment assembly. In particular, these one or more guide pins may also implement guide pins of the first guiding structure and may provide the coarse alignment between the first ferrule carrier and the second ferrule carrier.

According to a further embodiment of the invention, a subsea fiber optical connector is provided. The subsea fiber optical connector comprises a first connector part including an alignment assembly having any of the above outlined configurations. The first connector part further includes a first fiber ferrule mounted to the ferrule carrier of the alignment assembly. The connector comprises a second connector part that includes a second fiber ferrule mounted to a second ferrule carrier. By means of such fiber optical connector, advantages similar to the ones outlined further above may be achieved.

In an embodiment, the second ferrule carrier is fixedly mounted in the second connector part, it may in particular be fixed relative to a connector body or connector housing of the second connector part.

The second guiding structure may be mounted to or may form part of the second ferrule carrier. The second guiding structure may comprise at least one guide pin, guide hole, guide channel or guide recess.

In some configurations, the first guiding structure may comprise at least one guide pin, and the second guiding structure may comprise at least one guide hole, guide channel or guide recess configured to interact with the at least one guide pin, in particular to provide the coarse alignment. In other embodiments, the first guiding structure may comprise the at least one guide hole, guide channel or guide recess, and the second guiding structure may comprise the at least one guide pin.

In an embodiment, the first or second guiding structure comprises at least one, advantageously two, guiding channels that extend substantially parallel to the engagement direction. The guide channel has a forward end for receiving the at least one guide pin of the other guiding structure. The at least one guide channel may be open along an axial portion adjacent to the forward end. Open in this respect means that the channel may for example have a C-shaped or semi-circular cross section. Advantageously, the channel is open along its entire length. In such configuration, a locking between the guide channel and the guide pin may be prevented, for example when an angular misalignment above a certain degree is present.

The channel may form part of the outer peripheral surface of the ferrule carrier. In a particular embodiment, the first guiding structure or the second guiding structure may comprise at least two open guide channels that are open in axial direction, wherein the openings face away from the respective fiber ferrule.

A large degree of misalignment between the guide pin and the guide channel may thus be allowed without locking.

The guide hole, guide channel or guide recess of the first or second guiding structure may have a forward end for receiving a respective guide pin of the other guiding structure. The forward end may be tapered or may comprise a countersink for allowing an angular and/or rotational misalignment between the first ferrule carrier and the second ferrule carrier during mating. By such tapered end or countersink, the guide pin may be caught even when the misalignment is relatively large.

The fiber ferrule may be a multi-fiber ferrule comprising or holding plural optical fibers. Advantageously, at least four optical fibers are provided in the fiber ferrule. The fiber ferrule may hold a multi-fiber ribbon.

According to a further embodiment, a method of connecting a first connector part and a second connector part of a wet-mateable subsea connector is provided. The first connector part includes a first ferrule carrier to which a first fiber ferrule is mounted and which includes a first guiding structure. The second connector part includes a second ferrule carrier to which a second fiber ferrule is mounted and which includes a second guiding structure. The method comprises the steps of mating the first connector part with the second connector part; catching a guide pin forming part of the first or second guiding structure in a guide hole, guide channel or guide recess forming part of the other guiding structure; enabling rotational and/or lateral movement of the first ferrule carrier to allow the first ferrule carrier to align with the second ferrule carrier by interaction of the first guiding structure with the second guiding structure during engagement, and bringing one or more optical fibers of the first fiber ferrule into contact with respective optical fibers of the second fiber ferrule. By means of such method, an optical connection may be established in a reliable way at a subsea location, in particular when the first and second connector parts are mated by means of an ROV. By means of the automatic alignment between the first and second ferrule carriers, the above mentioned advantages may be achieved. In particular, a reliable mating and engagement of the fiber ferrules may be achieved even if the manufacturing tolerances of the first and second connector parts lead to a substantial misalignment between the first and the second fiber ferrules.

In embodiments of the method, the method may be performed by a first connector part and a second connector part having any of the above outlined configurations. As an example, the method may furthermore comprise the step of limiting a contact force between the first fiber ferrule and the second fiber ferrule by allowing the first and/or the second fiber ferrule to move backwardly against a spring force in the respective ferrule carrier during mating.

Furthermore, the method may comprise any of the steps described further above with respect to the alignment assembly or with respect to the subsea fiber optical connector.

It is to be understood that the features mentioned above and those yet to be explained below can be used not only in the respective combinations indicated, but also in other combinations or in isolation without leaving the scope of the present invention. In particular, in the present or in one or more divisional applications, claims may be aimed at the second ferrule carrier including the guide hole, guide channel or guide recess in any of the above mentioned configurations, or at the interaction between the first ferrule carrier and the second ferrule carrier.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

FIG. 5 is a schematic drawing showing a sectional top view of an alignment assembly according to an embodiment, wherein the first guiding structure is partly engaged with the second guiding structure.

FIG. 6 is a schematic drawing showing a sectional top view of an alignment assembly according to an embodiment in which the first fiber ferrule is engaged with the second fiber ferrule.

DETAILED DESCRIPTION

Figure 1:
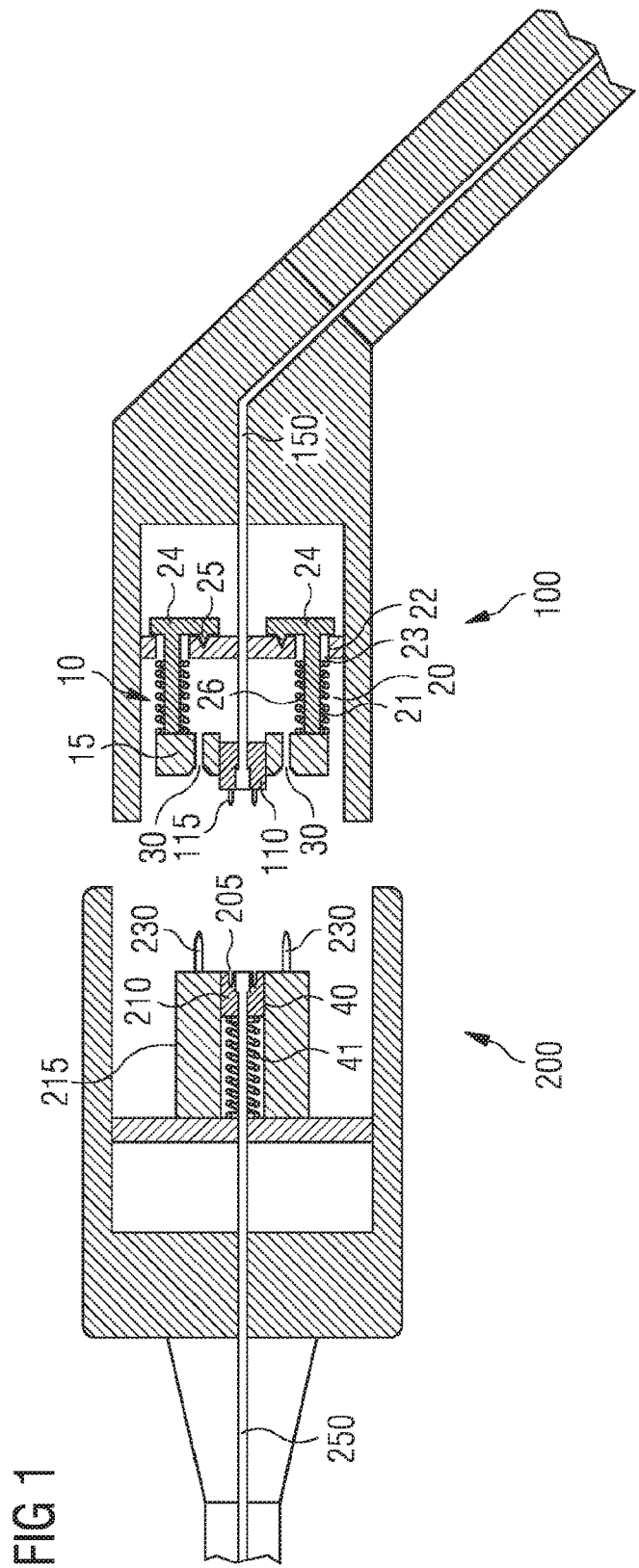
FIG. 1 is a schematic drawing showing a sectional side view of a subsea fiber optical connector according to an embodiment.

In the following, embodiments illustrated in the accompanying drawings are described in more detail. It should be clear that the following description is only illustrative and non-restrictive. The drawings are only schematic representations, and elements in the drawings are not necessarily to scale with each other.

FIG. 1 illustrates a wet-mateable subsea fiber optical connector having a first connector part 100 and a second connector part 200 according to an embodiment. When such connector parts are mated subsea, one connector part may for example be mounted to a bulkhead or the like and the other connector part may comprise an ROV handle (not shown) by means of which an ROV arm grabs the connector part and engages it with the other connector part. Each connector part 100, 200 include an optical contact in form of a fiber ferrule 110, 210, each holding one or more optical fibers. During mating, the optical fibers are brought into contact to establish the optical connection. The optical signals are transported by respective transmission lines 150, 250, which may include one or more optical fibers, for example a multi fiber ribbon. It should be clear that the configuration is not restricted to a direct contact between the optical fibers, but the optical connection may in some embodiments also be established via an intervening element.

Each fiber ferrule 110, 210 or a ferrule mount by means of which the respective fiber ferrule is mounted includes an alignment member 115, 205, which in the example of FIG. 1 is provided in form of pins on the first fiber ferrule 110 and respective recesses on the second fiber ferrule 210. The alignment members 115, 205 provide a precise alignment between the end faces of the one or more optical fibers in the respective ferrule, so that the optical connection can be established. Since the alignment of the optical fibers needs to be rather precise to prevent poor signal quality or signal loss, the alignment provided by the alignment members 115, 205 is herein also termed "fine alignment".

When a misalignment between the first and second fiber ferrules 110, 210 exceeds a certain limit, which is relatively small due to the required precision in the alignment, a fine alignment may no longer be achieved, so that poor signal quality or signal failure may result.

To prevent such negative effects, the first connector part 100 includes an alignment assembly 10 in accordance with an embodiment. The alignment assembly 10 includes a ferrule carrier 15 to which the first fiber ferrule 110 is mounted, either directly or indirectly via a ferrule mount 40, examples of which are given further below. The alignment assembly 10 further includes a support structure 20 by means of which the ferrule carrier 15 is mounted to the first connector part 100. In some embodiments, it may be mounted to a component of the first connector part 100 that is fixed relative to a housing or body of the first connector part 100, while in other embodiments, it may be mounted to a movable part of the first connector part 100, such as a damper body or the like. This component maybe considered to form part of the first support structure and is hereinabove designated as fixed part of the support structure.

The support structure 20 allows a movement of the ferrule carrier 15 relative to the first connector part 100. Advantageously, the movement is allowed in a lateral direction (substantially perpendicular to the direction in which the first and second fiber ferrules 110, 210 are engaged), and in one or more rotational directions. The lateral direction may for example be substantially parallel to an end face of the first fiber ferrule 110.

In the example of FIG. 1, the support structure 20 is implemented by rods 21 that are mounted to an extent rearwardly from the first ferrule carrier 15. These rods pass through an opening 22 in the fixed part of the support structure, in particular a component of the first connector part 100 to which the alignment assembly is mounted. The support structure 20 further includes springs 26 that urge the ferrule carrier 15 forwardly and a stopper element 24 that restricts the forward movement of the ferrule carrier 15. Furthermore, an alignment feature 25 is provided, which in the example of FIG. 1 includes a recess in the component to which the alignment assembly 10 is mounted and a protrusion on the stopper 24 which engages the recess. Accordingly, in the unmated state illustrated in FIG. 1, the ferrule carrier 15 is urged by the springs 26 into a predefined first position in which the ferrule carrier 15 has a predefined orientation.

From the first predefined position shown in FIG. 1, the ferrule carrier 15 can be pushed rearwardly, thus disengaging the alignment feature 25 and allowing lateral and rotational movement of the ferrule carrier 15 relative to the first connector part 100 due to the clearance 23. It should be clear that the configuration of FIG. 1 is only one example how the movement of the first ferrule carrier 15 with respect to the first connector part 100 can be achieved, and that the support structure 20 may be implemented differently.

The alignment assembly 10 further includes the first guiding structure 30 which is configured to interact with the second guiding structure 230 provided on the second ferrule carrier 215 of the second connector part 200. In the example of FIG. 1, the first guiding structure 30 is provided in the form of through holes in the ferrule carrier 15, wherein the forward end opening of these through holes are provided with a countersink. The second guiding structure 230 is provided by guide pins 35 that extend forwardly from the second ferrule carrier 215. By means of the countersink, the capture range of the first guiding structure 30 for the guide pins is increased.

The first guiding structure 30 is configured to interact with the second guiding structure 230 during the mating of the first and second connector parts 100, 200. Interaction of the first and second guiding structures during engagement generates a mechanical force when the first and second ferrules 110, 210 are out of alignment. As an example, if the ferrules are angled or laterally displaced towards one another, the guide pins will not hit the through holes at the right position and/or the right angle, thereby applying a mechanical force to the first ferrule carrier 15. This mechanical force pushes the ferrule carrier 15 backwardly against the force of the springs 26, and causes the alignment feature 25 to disengage. Accordingly, and in particular due to the clearance 23, the first ferrule carrier 15 is free to move and in particular can change its lateral position and/or angular orientation.

The first guiding structure 30 is configured such that the interaction will lead to an alignment of the first ferrule carrier 15 with the second ferrule carrier 215. This may for example be achieved by the mentioned countersinks and the pointed tips of the guide pins that are provided as the first and second guiding structures 30, 230. Upon alignment, the guiding pins will enter the through holes provided in the ferrule carrier 15, and the first and second fiber ferrules 110, 210 will get into contact. Due to the initial coarse alignment provided by the alignment assembly 10, the misalignment between the first and second fiber ferrules 110, 210 is thus relatively small, so that the alignment members 115, 205 can be engaged and can provide fine alignment of the first and second fiber ferrules. An optical contact may thus be established in a reliable way.

In particular, with such configuration, an automatic coarse alignment between the first and second fiber ferrules 110, 210 can be achieved. This is particularly important in subsea applications where the coarse alignment cannot occur by the operator, since there is no access to the ferrule carriers when the two connector parts are deployed subsea. It should be clear that in other embodiment, the guiding structures 30, 230 can be configured to also provide the fine alignment, so that the alignment members 115, 205 are not required.

In the embodiment of FIG. 1, the second fiber ferrule 210 is mounted to the second ferrule carrier 215 by means of a fiber mount 40 that includes a recess in the ferrule carrier 215 in which the second fiber ferrule 210 can move rearwardly. Rearwardly refers to a direction towards the rear of the connector, wherein the front of the connector is considered to be the part of the connector at which it is engaged with the respective other part of the connector.

The ferrule mount 40 includes the spring 41 that urges the second fiber ferrule 210 forwardly. During mating of the first and second connector parts 100, 200, the first fiber ferrule 110 can thus get into contact with the second fiber ferrule 210 and push the second fiber ferrule 210 rearwardly against the force of spring 41. Thereby, the contact force between the first and second fiber ferrules 110, 210 can be limited; it can in particular be kept below a predetermined threshold above which damage to the fiber front end faces may occur. The establishing of the optical contact by means of the fiber ferrules 110, 210 may thus be made more reliable.

While in the embodiment of FIG. 1, the ferrule mount 40 that limits the contact forces between the two fiber ferrules is provided in the second connector part 200, it may in other embodiments be provided in the first connector part 100, as shown hereinafter.

Figure 2:
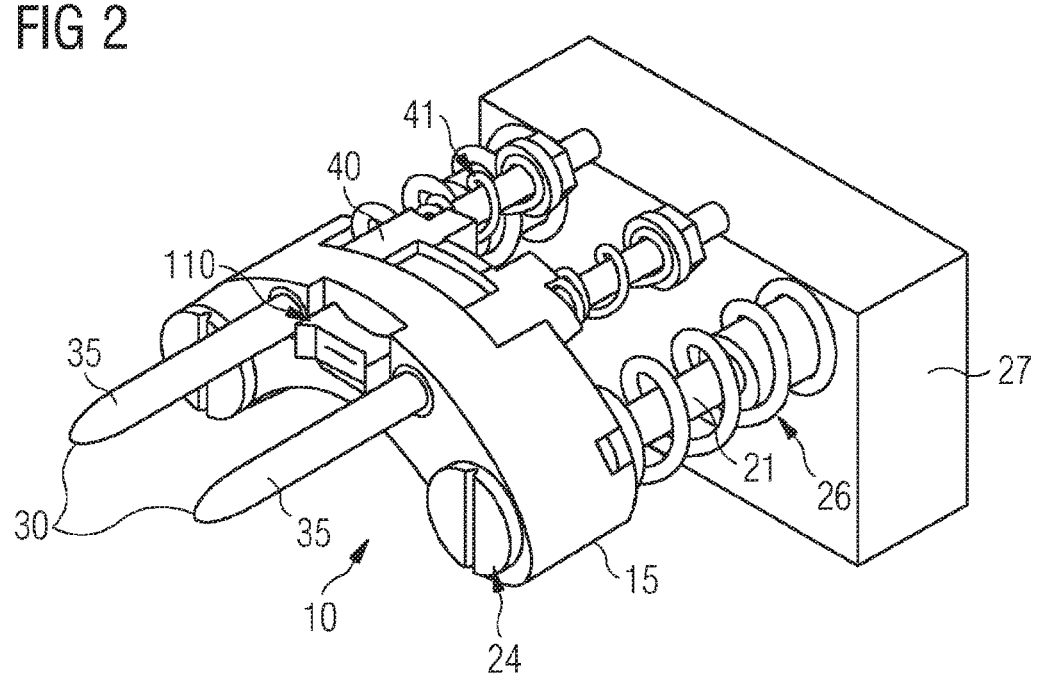
FIG. 2 is a schematic drawing showing a perspective view of an alignment assembly according to an embodiment.

FIG. 2 illustrates a further embodiment of the alignment assembly 10. The embodiment of FIG. 2 is a modification of the embodiment of FIG. 1, so that the explanations above are equally applicable. In the embodiment of FIG. 2, the support structure 20 comprises rods or bolts 21 that are fixedly mounted to a component 27 of the first connector part 100. Component 27 may be fixed with respect to a housing or body of the first connector part 100, or it may be a movable component that is also allowed to move, such as a part of a damper unit that dampens the forces applied during mating. Component 27 is considered to constitute a fixed part of the support structure 20. The openings 22 are now provided in the first ferrule carrier 15 (not visible in FIG. 2). The stopper elements 24 are provided by countersunk heads at the end of the rods 21, in particular countersunk screw heads. The alignment feature 25 is provided by an interaction of the countersunk head 24 with a respective seat provided in the ferrule carrier 15. The seats of the alignment feature 25 are provided in form of countersinks at the end of the openings 25 extending through the ferrule carrier 15. The springs 26 urge the ferrule carrier 15 forwardly, and thus urge the seats into engagement with the countersunk heads 24. Accordingly, in the first position illustrated in FIG. 2, the ferrule carrier 15 has a predefined position and orientation with respect to the component 27 of the first connector part 100.

As illustrated in FIG. 2, the ferrule carrier 15 may have a curved shape so that it can be positioned in outer peripheral part of the connector body of the first connector part 100. The alignment assembly 10 further includes a ferrule mount 40 by means of which the first fiber ferrule 110 is mounted to the ferrule carrier 15. The ferrule mount 40 will be explained in more detail with respect to FIG. 4 further below.

The first guiding structure 30 is in the embodiment of FIG. 2 provided in the form of two guide pins 35 that are mounted to an extent forwardly from the ferrule carrier 15. The guide pins 35 have tapered ends so as to facilitate the engagement with the complementary second guiding structure.

Figure 3:
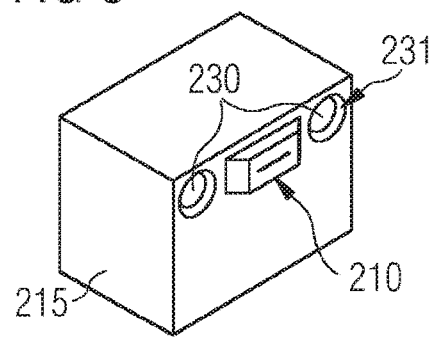
FIG. 3 is a schematic drawing showing a perspective view of a ferrule carrier according to an embodiment.

FIG. 3 illustrates an example of the second ferrule carrier 215 including the second guiding structure 230 in form of recesses or holes in the ferrule carrier 215. As illustrated, countersinks 231 are provided on the second guiding structure 230 in order to increase the capture range for the guide pins 35 of the first guiding structure. In the example of FIG. 3, the second fiber ferrule 210 is directly mounted to the ferrule carrier 215. A relatively simple structure of the second ferrule carrier 215 can thus be achieved.

Figure 4:
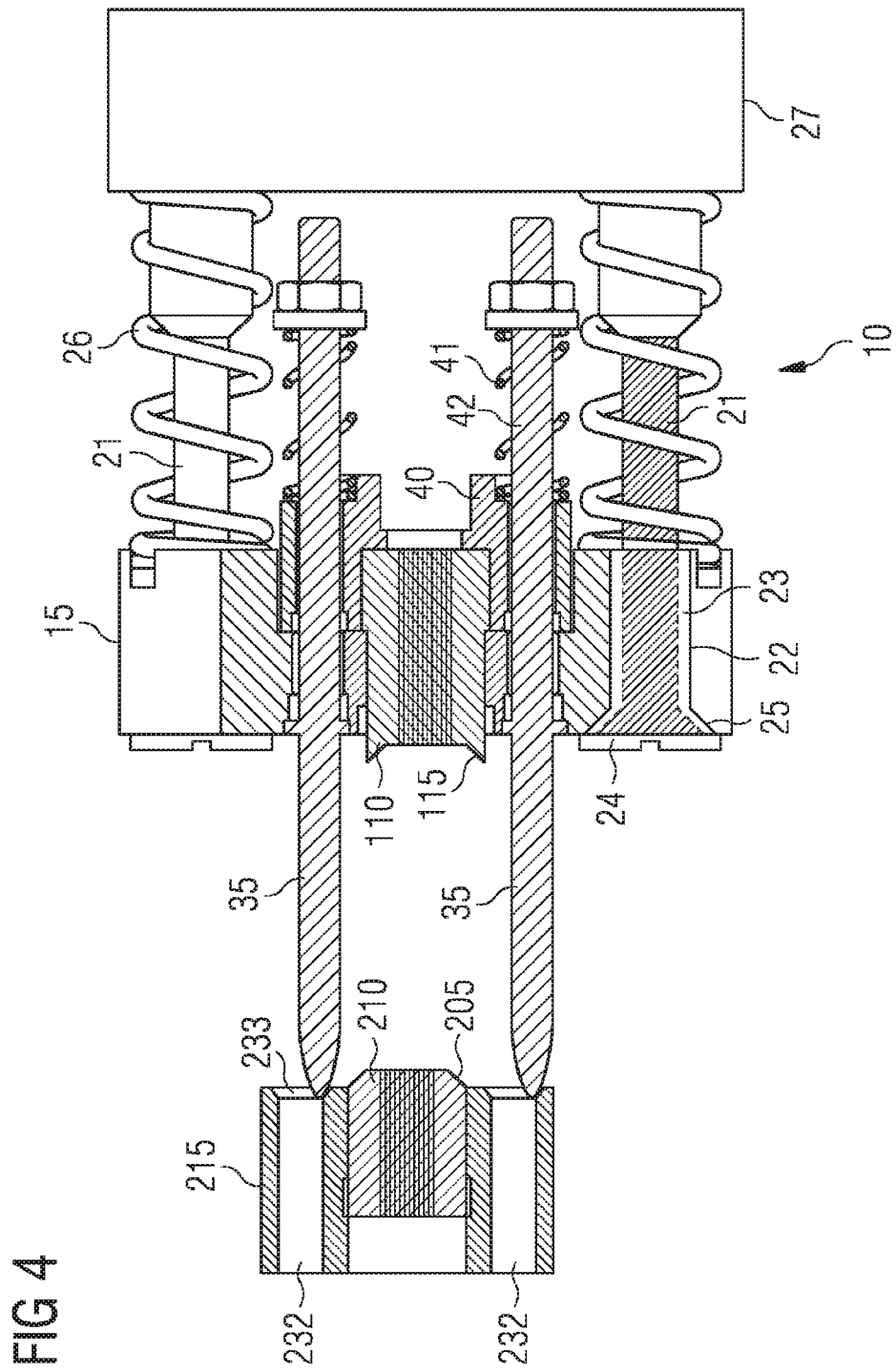
FIG. 4 is a schematic drawing showing a sectional top view of an alignment assembly according to an embodiment, illustrating a misalignment between the first and second ferrule carriers.

FIG. 4 shows a partially sectional top view of the alignment assembly 10 of FIG. 2 and the second ferrule carrier 215 of FIG. 3. In FIG. 4, one of the through holes 22 of the first ferrule carrier 15 is now visible. The rods 21 have an outer diameter that is smaller than the inner diameter of the through holes 22, thus providing a clearance 23 there between. Furthermore, the alignment feature 25 is now visible which comprises a seat in form of a recess or countersink in the ferrule carrier 15 and the countersunk head 24 on the end of the rod 21. FIG. 4 illustrates a state in which the ferrule carrier 15 is in the first position and thus has a predefined position and orientation with respect to the component 27 of the first connector part 100. Countersunk heads 24 are thus in engagement with the respective seat in ferrule carrier 15.

FIG. 4 furthermore illustrates the ferrule mount 40 by means of which the first fiber ferrule 110 is mounted to the ferrule carrier 15. Ferrule mount 40 has two through holes through which pins 42 extend rearwardly from the ferrule carrier 15. The ferrule mount 40 can slide rearwardly on the pins 42. Springs 41 urge the ferrule mount 40 forwardly into a position in which it abuts against the ferrule carrier 15. The pins 42 comprise end plates (washers) and nuts in order to provide a stop for the springs 41. First fiber ferrule 110 is fixedly mounted to the ferrule mount 40 and can slide in an opening in ferrule carrier 15. Accordingly, first fiber ferrule 110 can be pushed rearwardly against the force of springs 41. The spring constant of springs 41 is generally lower than the spring constant of springs 26, so that interaction of the first and second fiber ferrules 110, 210 can lead to a compression of springs 41 to limit the interaction force, but will generally not lead to a significant compression of the springs 26.

It is furthermore noted that the pin 35 of the first guiding structure and the pin 42 of the ferrule mount 40 can be provided by a single pin that extends through the ferrule carrier 15, as illustrated in FIG. 4. A more compact configuration having reduced complexity may thus be achieved.

FIG. 4 furthermore illustrates a further implementation of the alignment member 115, 205 for providing a fine alignment between the first and second fiber ferrules 110, 210. In the embodiment of FIG. 4, the alignment member is provided in form of a complementary shape of the end faces of the first and second fiber ferrules 110, 210. Alignment member 115 is provided in form of a recess in the end face of the first fiber ferrule 110. The alignment member 205 is provided in form of a complementary protrusion of the end face of the second fiber ferrule 210. It should be clear that the configuration may be vice versa, or that a more complex structure of the complementary end faces of the first and second fiber ferrules 110, 210 may be provided.

FIG. 4 illustrates a lateral misalignment between the first ferrule carrier 15 and the second ferrule carrier 215, which may for example be caused by respective manufacturing tolerances of the first and second connector parts. In the state illustrated in FIG. 4, the first guiding structure 30 has just come into contact with the second guiding structure 230, which is provided in form of holes 232 within the second ferrule carrier 215. As can be seen, the countersinks 233 provided at the forward end face of the ferrule carrier 215 allows a capturing of the tips of the guide pins 35, even though the lateral displacement between the first and second ferrule carriers 15, 215 is relatively large.

Upon further engagement of the first connector part with the second connector part, the mechanical interaction between the first and second guiding structures 30, 230 creates a mechanical force that pushes the guide pins 35 together with the ferrule carrier 15 rearwardly towards the component 27 of the first connector part. Rearward movement of ferrule carrier 15 occurs if the applied force exceeds the spring force of springs 26 that urge the ferrule carrier 15 forwardly.

Upon rearward movement of the ferrule carrier 15, the alignment feature 25 becomes disengaged, i.e. the countersunk head 24 separates from the seat provided in ferrule carrier 15. Accordingly, due to the recess 23, the ferrule carrier 15 is free to move laterally in two directions. Furthermore, depending on the size of clearance 23 which is provided for both rods 21, the ferrule carrier 15 can be rotated about all three rotational directions/axes. It may for example rotate a limited angle about an axis that runs perpendicular to the engagement direction in the drawing plane, about an axis that runs parallel to the mating direction in the drawing plane, and an axis that is perpendicular to the before-mentioned two rotational axes.

Upon further proceeding of the mating between the first and second connector parts 100, 200, the guide pins 35 thus slide into the holes 232, thereby moving the ferrule carrier 15 laterally, in particular upwardly in the state as illustrated in FIG. 4.

The next state is illustrated in FIG. 5 in which the guide pins 35 have entered the holes 232. At reference numeral 29, it can be seen that the countersunk head 24 has left the seat provided in the ferrule carrier 15, thereby enabling the lateral displacement of the ferrule carrier 15. A coarse alignment between the first and second fiber ferrules 110, 210 is thus achieved. Upon further engagement, the first and second fiber ferrules 110, 210 come into contact with each other, and fine alignment is provided by the alignment members 115, 205.

This is illustrated in FIG. 6. The alignment members 115, 205 are now in engagement and have aligned the optical fibers that are been held by the fiber ferrules 110, 210. Thus, an optical connection is established in a reliable manner. Furthermore, the contact force between the first and the second fiber ferrules is limited by the spring force applied by the springs of the ferrule mount 40. Application of a larger force by the second fiber ferrule 210 would lead to a rearward movement of the first fiber ferrule 110, thereby limiting the applied force.

Figure 7:
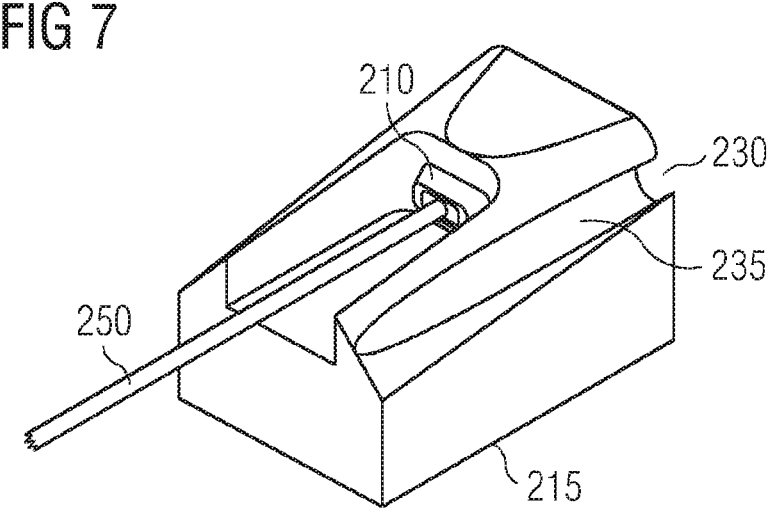
FIG. 7 is a schematic drawing showing a perspective view of a second ferrule carrier according to an embodiment.

FIG. 7 illustrates a particular embodiment of the second ferrule carrier 215. In this embodiment, the second guiding structure is provided in form of two guide channels 235 that are open along an axial direction. With through holes as illustrated in FIG. 6, a locking between the guide hole 232 and the guide pin 35 may occur if the angular misalignment exceeds a certain degree. By providing the second guiding structure 230 in form of open guide channels 235, such locking may be prevented, or may only occur at significantly larger misalignment angles.

It should be clear that in other configurations, guide pins may be provided on the second ferrule carrier 215, while guide holes 232 or guide channels 235 in any of the above outlined configurations may be provided on the first ferrule carrier 15.

Figure 8:
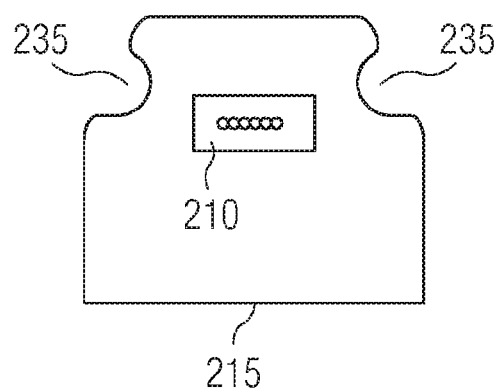
FIG. 8 is a schematic drawing showing a front view of the front face of a second ferrule carrier according to an embodiment.

FIG. 8 illustrates a front view of the second ferrule carrier 215 of FIG. 7. As can be seen in FIG. 8, the guide channels 235 have a substantially C-shaped or semi-circular cross section. Furthermore, the open sides of the guide channels 235 face outwardly and away from the second fiber ferrule 210. The guide channels 235 form part of the outer periphery of the second ferrule carrier 215.

It should be clear that the features of the above described embodiments and configurations can be combined with each other unless noted to the contrary. As an example, the alignment members 115, 205, the ferrule mount 40 or the first and second guiding structures 30, 230 as described with respect to FIG. 1 may be used in any of the embodiments described with respect to FIGS. 2 to 8, and vice versa.

While specific embodiments are disclosed herein, various changes and modifications can be made without departing from the scope of the invention. The embodiments described herein are to be considered in all respects as illustrative and non-restrictive, and any changes coming within the meaning and equivalency range of the appended claims are intended to be embraced therein.

The invention claimed is:

1. An alignment assembly of a first connector part for aligning a first fiber ferrule of the first connector part with a second fiber ferrule of a second connector part during mating of the first connector part with the second connector part, the alignment assembly comprising:
a ferrule carrier to which the first fiber ferrule is mounted;
a support structure by means of which the ferrule carrier is mounted to the first connector part, wherein the support structure is configured to allow a movement of the ferrule carrier relative to the first connector part in at least a lateral direction that is substantially perpendicular to an engagement direction of the first fiber ferrule with the second fiber ferrule; and
a first guiding structure that is mounted to or forms part of the ferrule carrier, wherein the first guiding structure is configured to mechanically interact with a complementary second guiding structure that is provided in the second connector part, the interaction being such that during mating of the first connector part with the second connector part, the ferrule carrier is moveable on the support structure at least in the lateral direction into alignment with a second ferrule carrier carrying the second fiber ferrule of the second connector part.

2. The alignment assembly according to claim 1, wherein the support structure comprises a guide along which the ferrule carrier is movable in the engagement direction, wherein a clearance is provided between the guide and the ferrule carrier to allow the movement of the ferrule carrier in at least the lateral direction relative to the first connector part.

3. The alignment assembly according to claim 2, wherein the guide comprises at least one guiding rod, guiding pin or guiding bolt that is mounted fixedly with respect to the first connector part or with respect to the ferrule carrier.

4. The alignment assembly according to claim 1, wherein the ferrule carrier and the support structure have an alignment feature that fixedly positions the ferrule carrier in a predetermined position and orientation when the first connector part is in a de-mated state.

5. The alignment assembly according to claim 4, wherein the alignment feature comprises a seat on one of the ferrule carrier or a fixed part of the support structure, and comprises an engagement element on the other of the ferrule carrier or the fixed part of the support structure, wherein the seat is shaped to receive the engagement element to provide the alignment in the predetermined position.

6. The alignment assembly according to claim 5, wherein the engagement element is a countersunk head of a guiding rod, a guiding pin or a guiding bolt, and wherein the seat is shaped to receive the countersunk head to provide said alignment.

7. The alignment assembly according to claim 1, wherein the ferrule carrier is urged by a spring into a first position in which the ferrule carrier has a predetermined alignment with respect to the first connector part, and is movable during mating against the spring force into a second position in which the alignment of the ferrule carrier with respect to the first connector part is released to allow said movement in lateral direction.

8. The alignment assembly according to claim 1, wherein the support structure is configured to allow a movement of the ferrule carrier relative to the first connector part in at least two rotational directions and/or in two lateral directions that are substantially perpendicular to the engagement direction of the first fiber ferrule with the second fiber ferrule.

9. The alignment assembly according to claim 1, further comprising:
a ferrule mount by means of which the first fiber ferrule is mounted to the ferrule carrier, wherein the ferrule mount is configured to allow a movement of the first fiber ferrule relative to the ferrule carrier in a direction substantially parallel to the engagement direction.

10. The alignment assembly according to claim 9, wherein the ferrule mount comprises a preloading element that applies a predefined preloading force to the first fiber ferrule in a forward direction.

11. A subsea fiber optical connector, comprising:
a first connector part including an alignment assembly according to claim 1 and a first fiber ferrule mounted to the ferrule carrier of the alignment assembly, and
a second connector part comprising a second fiber ferrule mounted to a second ferrule carrier of the second connector part.

12. The subsea fiber optical connector according to claim 11, wherein the second guiding structure is mounted to or forms part of the second ferrule carrier, and wherein the second guiding structure comprises at least one guide pin, guide hole, guide channel or guide recess.

13. The subsea fiber optical connector according to claim 11, wherein the first guiding structure comprises at least one guide pin, and wherein the second guiding structure comprises at least one guide hole, guide channel or guide recess configured to interact with the at least one guide pin, or wherein the first guiding structure comprises at least one guide hole, guide channel or guide recess and the second guiding structure comprises at least one guide pin configured to interact with the guide hole, guide channel or guide recess, respectively.

14. The subsea fiber optical connector according to claim 13, wherein the first guiding structure or the second guiding structure comprises at least one guiding channel that extends substantially parallel to the engagement direction and that has a forward end for receiving the at least one guide pin of the other guiding structure, wherein the at least one guiding channel is open along an axial portion adjacent to the forward end or is open along its entire length.

15. The subsea fiber optical connector according to claim 14, wherein the first guiding structure or the second guiding structure comprises two guiding channels that extend substantially parallel to the engagement direction and that have a forward end for receiving the at least one guide pin of the other guiding structure.

16. The alignment assembly according to claim 1, wherein the first guiding structure comprises at least one guide pin, and wherein the second guiding structure comprises at least one guide hole, guide channel or guide recess configured to interact with the at least one guide pin, or wherein the first guiding structure comprises at least one guide hole, guide channel or guide recess and the second guiding structure comprises at least one guide pin configured to interact with the guide hole, guide channel or guide recess, respectively.

17. The alignment assembly according to claim 16, wherein the first guiding structure or the second guiding structure comprises at least one guiding channel that extends substantially parallel to the engagement direction and that has a forward end for receiving the at least one guide pin of the other guiding structure, wherein the at least one guide channel is open along an axial portion adjacent to the forward end.

18. The alignment assembly according to claim 17, wherein the first guiding structure or the second guiding structure comprises two guiding channels that extend substantially parallel to the engagement direction and that have a forward end for receiving the at least one guide pin of the other guiding structure.

19. A method of connecting a first connector part and a second connector part of a wet-mateable subsea connector, the first connector part including a first ferrule carrier to which a first fiber ferrule is mounted and which includes a first guiding structure, and the second connector part including a second ferrule carrier to which a second fiber ferrule is mounted and which includes a second guiding structure, the method comprising:
mating the first connector part with the second connector part,
catching a guide pin forming part of the first or second guiding structure in a guide hole, guide channel or guide recess forming part of the other guiding structure during the mating step to generate an interference in an engagement direction effective to move an alignment feature from an engaged position to a disengaged position, thereby
enabling rotational and/or lateral movement of the first ferrule carrier to allow the first ferrule carrier to align with the second ferrule carrier by interaction of the first guiding structure with the second guiding structure during engagement, and
bringing one or more optical fibers of the first fiber ferrule into contact with respective optical fibers of the second fiber ferrule.

20. An alignment assembly of a first connector part for aligning a first fiber ferrule of the first connector part with a second fiber ferrule of a second connector part during mating of the first connector part with the second connector part, the alignment assembly comprising:
a ferrule carrier to which the first fiber ferrule is mounted;
a support structure by means of which the ferrule carrier is mounted to the first connector part, wherein the support structure is configured to allow a movement of the ferrule carrier relative to the first connector part in at least a lateral direction that is substantially perpendicular to an engagement direction of the first fiber ferrule with the second fiber ferrule; and
a first guiding structure that is mounted to or forms part of the ferrule carrier, wherein the first guiding structure is configured to mechanically interact with a complementary second guiding structure that is provided in the second connector part, the interaction being such that during mating of the first connector part with the second connector part, the ferrule carrier is moveable on the support structure into alignment with a second ferrule carrier carrying the second fiber ferrule of the second connector part
wherein the support structure is configured to allow a movement of the ferrule carrier relative to the first connector part in at least two rotational directions and/or in two lateral directions that are substantially perpendicular to the engagement direction of the first fiber ferrule with the second fiber ferrule;
wherein the support structure is configured to allow a movement of the ferrule carrier relative to the first connector part in three rotational directions.

21. A connector assembly comprising:
a first connector part comprising a first ferrule;
a second connector part comprising a second ferrule configured to mate with the first ferrule upon mating of the first and second connector parts;
a support structure supporting the first ferrule within the first connector part; and
an alignment feature configured to locate the support structure in a predetermined position with respect to the first connector part when in an engaged position and to allow movement of the support structure within the first connector part when in a disengaged position;
wherein a misalignment of the first and second ferrules during mating of the first and second connector parts that causes an interference contact in an engagement direction is effective to move the alignment feature from the engaged position to the disengaged position, thereby allowing movement of the support structure within the first connector part to release the interference contact and to at least partially mitigate the misalignment.

* * * * *